(12) United States Patent
Englefield et al.

(10) Patent No.: US 6,335,738 B1
(45) Date of Patent: Jan. 1, 2002

(54) METHOD AND TOOL FOR GENERATING AND DISPLAYING A DESCRIPTIVE ANNOTATION OF SELECTED APPLICATION DATA

(75) Inventors: Paul Jonathan Englefield; Mark Justin Paul Tibbits, both of Leamington Spa; Raymond Trainer, Warwick; James Whiting, North Woolwich, all of (GB)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/226,910

(22) Filed: Jan. 5, 1999

(30) Foreign Application Priority Data

Jul. 24, 1998 (GB) ............................................. 9816098

(51) Int. Cl.[7] ................................................. G06F 3/14
(52) U.S. Cl. ...................... 345/744; 345/812; 345/856; 345/857; 707/503; 709/201
(58) Field of Search .......................... 707/503; 709/201, 709/747; 345/744, 739, 738, 812, 811, 813, 853, 854, 856, 857

(56) References Cited

U.S. PATENT DOCUMENTS

| | | | | |
|---|---|---|---|---|
| 5,428,733 A | * | 6/1995 | Carr | 345/342 |
| 5,434,965 A | * | 7/1995 | Matheny | 345/338 |
| 5,924,077 A | * | 7/1999 | Beach | 705/10 |
| 6,055,548 A | * | 4/2000 | Comer | 707/503 |
| 6,138,130 A | * | 10/2000 | Adler | 707/503 |

FOREIGN PATENT DOCUMENTS

GB    WO 96/39655    12/1996

\* cited by examiner

Primary Examiner—Raymond J. Bayerl
Assistant Examiner—Thomas T. Nguyen
(74) Attorney, Agent, or Firm—Louis J. Percello; Fitch, Even, Tabin & Flannery

(57) ABSTRACT

A set of software components, a system and a method provide to a user of a data processing system per-value interpretative information relating to application data values. The method includes the following steps: in response to user selection of a set of an application component's data values, generating per-value interpretation information corresponding to the selected data values; and, in response to subsequent movement of an input device pointer into a display screen area associated with a data value within the set, presenting the interpretation information to the user via an output device connected to the data processing system. A processing component selectable by the user from set of processing components preferably responds to user selection of both the operation to be performed and a set of application data by performing the processing operation on the set of data to produce a result, and then generating per-value interpretation information corresponding to that result. The presentation of interpretation information to the user preferably uses a flyover text box in a GUI, as is known in the art for application-specific Bubble Help.

25 Claims, 14 Drawing Sheets

SmartMarker and Palette Java Beans

| SmartMarker |
|---|
| SmartMarker( ) <br> <clinit>( ) <br> addNotify( ) <br> removeNotify( ) <br> removeWarning( ) <br> stashAlgorithm( ) <br> paint( ) <br> copyright( ) <br> getStyleName( ) <br> setStyleName( ) <br> setContractName( ) <br> setAlgorithmName( ) <br> getMinimumSize( ) <br> getSmartMarkerName( ) <br> setSmartMarkerName( ) <br> getPreferredSize( ) <br> getOptions( ) <br> setOptions( ) <br> getContract( ) <br> getAlgorithm( ) <br> getStyle( ) |

FIG. 11A

| SmartMarkerPalette |
|---|
| updateSmartMarkerLegand( ) |
| updateSmartMarkerList( ) |
| SmartMarkerPalette( ) |
| finalize( ) |
| addNotify( ) |
| dumpGraphics( ) |
| refreshStyle( ) |
| paint( ) |
| showPanel( ) |
| render( ) |
| update( ) |
| getSmartMarkerImageStyle( ) |
| copyright( ) |
| updateSmartMarkerDirection( ) |
| getMinimumSize( ) |
| getPreferredSize( ) |
| mouseExited( ) |
| mouseClicked( ) |
| updateSmartMarkerHelp( ) |
| mouseEntered( ) |
| mousePressed( ) |
| mouseReleased( ) |
| getHighColor( ) |
| actionPerformed( ) |
| componentMoved( ) |
| componentShown( ) |
| componentHidden( ) |
| componentResized( ) |
| selectSmartMarker( ) |

FIG. 11B

METHOD AND TOOL FOR GENERATING AND DISPLAYING A DESCRIPTIVE ANNOTATION OF SELECTED APPLICATION DATA

FIELD OF THE INVENTION

The present invention relates to methods and tools for visually aiding interpretation of data displayed on a computer display device.

BACKGROUND OF THE INVENTION

A well known mechanism for guiding a computer user's interaction with the computer is 'Bubble Help' (also known as 'Tool Tips' and 'Hover Help'). The 'Bubble Help' mechanism aids user interaction by displaying to a user a text label explaining user interface mechanisms, such as explaining the functions represented by tool bar graphics or explaining what data a user should enter in an entry field. The explanatory text displayed via the Bubble Help mechanism is a static piece of information which is specific to and embedded within an application program. Text associated with a particular icon, field or other screen element is displayed alongside the associated icon or element in response to an input device pointer being moved into close proximity to the respective graphics or other screen element.

Other known forms of help system include context-sensitive on-line user guides which are specific to an application and which have functions for displaying to the user, in response to requesting help from within the application, specific predefined help information which is relevant to the part of the application which is currently active. Various parts of, or screen locations within, the application have labels associated with them which point to the relevant help text when help is requested.

These various user guidance mechanisms are directed at explaining functions or explaining what action is required of a user rather than aiding interpretation of data. The information they present to the user is predefined for the application (that is, predefined for the active part of the application or for a specific icon or field) and typically provides no help with interpretation of the data managed by the application.

Spreadsheet application programs provide tools which help with data analysis, but the type of analysis supported is not only specific to the spreadsheet application but also specific to a type of processing that users are expected to perform and which is always performed in the same way (for example, calculating totals for a complete column of data values, or adding a chosen percentage to those totals, or generating a graphical representation of a predefined set of elements in a table). Such tools within spreadsheets are not suitable for unplanned, flexible data interpretation operations such as exploring a selected set of data to find patterns, trends and exceptions.

Advances in the provision of assistance with interpretation of displayed data are disclosed in U.S. Pat. No. 5,896,491 to Englefield based on International patent application No. PCT/GB9502286 (publication No. WO96/39655), and which is assigned to the assignee of the present application and is incorporated herein by reference. Englefield discloses an object model in which operations are implemented as selectable instances of object classes which define the operations (as methods and properties). The operations can be applied to selected sets of data managed by any of a number of application programs (which may include speadsheets, word processors, Web browsers, databases). The algorithm within each operator object are independent executables that can be shared by all application programs which are able to interface with the operator objects.

The operations disclosed in Englefield include interpretation operations which visually adapt the displayed selected data set. One example is the application of colour codes to elements of an application's table of numerical data values where the codes indicate whether each value is above or below the average for the selected data set. Another example applies colour codes which indicate a ranking of data values in order of magnitude. Another example operation identifies positive and negative trends within numerical data by colour coding. For character data, one example operation is a spell check operation which highlights words which are not recognised by the spell check operation.

Englefield also discloses data-generating operations being performed by independently executable algorithms on selected sets of data managed by any one of a number of different application programs enabled to interface with the algorithms. Examples of the operations which process selected application-managed data to generate some additional data are sum, arithmetic mean and standard deviation computation operations. Further disclosed example operations include the generation of graphical representations of the magnitudes of the selected data values.

Although Englefield discloses a mechanism which greatly assists the user to recognize patterns, trends and exceptions within data, and avoids the need to replicate functions within multiple different application programs by implementing operations via generic objects that can be applied to the data of different applications, it does not provide any support for per-value interpretation of data beyond what can be discerned from a graph or from colour codes or other applied emphasis.

DISCLOSURE OF INVENTION

The present invention provides a mechanism and a method for presenting a per-value interpretation of data to a user of a data processing system.

According to one aspect of the invention, there is provided a mechanism for providing a per-value interpretation of data to a user of a data processing system, including: one or more processing components, responsive to user selection of an operation to be performed and user selection of a set of an application component's data values, for processing the selected set of data values to generate a result; wherein said one or more processing components have means for generating per-value interpretation information corresponding to said generated result, and for providing said interpretation information to the application component for display to the user.

Logic for performing a particular processing operation on a set of data values, including processing the set of data values and generating per-value interpretation information, is preferably encapsulated within a respective processing object or a set of associated objects in an object oriented data processing environment. (An example processing operation may calculate an average for a set of data values and then compare each value with the average and generate information describing the relation of each value to the average). The application component comprises a second object adapted to interface with this processing object or set of objects. According to this preferred embodiment of the invention, a processing object class provides methods for performing operations on an application component's data and for providing per-value interpretation information back to the application component. Each processing object is thus an instance of a processing object class that processes selected data from any one of a number of application components adapted to interface with the generic object. The application component is responsible for displaying the interpretation information to the user. This is a distinction from typical prior art interpretation operations which are written specifically for a single application and are embedded within the sequential code of that application and limited to it. Prior art interpretation operations may even be limited to a predefined set of data elements within an application.

An "application component" in this context is not limited to a component programming environment and may be any application program or any part of an application program or applet, (such as a Java Bean (TM) or Active/X control), which is able to provide its data values to the processing component or part and to receive the returned interpretation information. Example components range from fine grained components such as entry fields and buttons, through medium grained components such as grids, tables and tree views, to more sophisticated components such as charts and spreadsheets.

A "set" of data values may be a single value or a plurality of values. The interpretation information in a preferred embodiment describes the relation of a specific selected data value to other values in a selected data set or to an absolute reference value, this relation being determined by the logic for processing the selected set of data. The interpretation information is preferably displayed to the user on a display device connected to the data processing system, subsequent to selection of the set of data values, in response to an input device pointer being moved into close proximity to a specific data value to select it.

The interpretation information may, for example, be displayed as transiently-displayed 'flyover' alphanumeric text using the presentation mechanism known for 'Bubble Help', or as a status line message. Use of the 'Bubble Help' mechanism to display per-value data interpretation information is not known in the prior art. The derivation of interpretative information from the relationship of a selected value to a set of values or to a reference value and then display of that interpretative information is also not known.

The processing of selected data by a processing object is dynamically performed in response to selection of both the operation to be performed and the data value or values it is to be performed on. Dynamic processing, with a result which is dependent on both the processing operation and the current selected data value or values, is a distinction from prior art help functions which simply retrieve a predefined stored piece of information in response to mouse pointer location. The provision of dynamically generated per-value interpretation results for selected data from any one of a number of application components represents an improvement in both the flexibility and usefulness of the data interpretation as compared with the prior art.

According to one embodiment of the invention, the dynamic processing of application data by a generic processing object is a calculation which compares each value of a selected set of data values with other data values in a selected set or with a reference value and then generates annotation information corresponding to the result of that calculation for each value. An alphanumeric annotation text string may be generated for some operations by combining a numerical result of the calculation with associated text stored by the processing object (slotting a calculation result and associated text into a template). An example string for a data value within a selected set is:

"N is within 10% of row mean M"

where N is the selected data value and M is the calculated mean of the respective row of a selected data set, and the wording "is within 10% of row mean" is text which is selected by comparing the values M and N and mapping the result of the comparison to one of a number of result categories having corresponding stored text strings. Each result of a calculation performed on a data value is matched with one of the plurality of different result categories which each have different text. The text to be included in the output string could be any interpretative information.

For other operations, and in other embodiments, the text may be set to contain any string that can be algorithmically derived from the value, the selected set of values, and any reference values.

As a further alternative, the interpretative annotation information could be generated by a database lookup operation using the result of the calculation as a key into the database to obtain information for display.

Instead of a text string, the interpretative annotation information could be a sound clip or any other media component or combination of components, and the annotation information could be any interpretative information which is relevant to the current data value or values and the current processing operation. Thus, "displaying" of the information to a user may mean playing a sound clip or a video clip or displaying a flyover text box on a screen, or any other method of information presentation.

A method according to a second aspect of the invention provides to a user of a data processing system per-value interpretative information relating to application data values, the method including the steps of: in response to user selection of a set of an application component's data values, generating per-value interpretation information corresponding to said selected data values; and in response to movement of an input device pointer into a display screen area associated with a data value within said selected set of data values, presenting said interpretation information to the user via an output device connected to the data processing system.

A method according to a further aspect of the invention provides to a user of a data processing system per-value interpretative information relating to data values of an application component, the method including the steps of: in response to user selection of an operation to be performed and user selection of a set of an application component's data values, processing the selected set of data values to generate a result; generating per-value interpretation information corresponding to said generated result; and providing said interpretation information to the application component for display to the user.

A method according to one embodiment of the invention includes the following sequence of steps: user selection of an operation to be performed; user selection of a set of data to be processed; processing of each data value in the set with reference to other data values within the set or by comparison with a reference value, and generation of an annotation string representing the relation of each value to the other values or the reference value; user selection of a particular data value within the set (such as by mouse proximity); accessing of the annotation string relating to the particular selected value and displaying of the annotation string. In the preferred embodiment, the processing of the selected set of values and generation of per-value interpretative annotation strings is performed by a generic processing object which then returns a set of annotation strings to the application component. Particular annotation strings are then displayed by the application component in response to the user selection of a particular data value by mouse pointer positioning.

According to one embodiment, the mechanisms and methods according to the invention are implemented as a set of software components for controlling the operation of a data processing system. The software components may be provided within a computer program product comprising computer program code recorded on a computer readable storage medium. The invention may be implemented within an Internet or intranet Browser, or within an application development toolkit such as a visual builder.

According to a further aspect of the invention there is provided a set of software components for use in a data processing system having a connected display device for displaying data, an input controller responsive to signals received from an input device connected to the system for moving a pointer displayed on the display device so as to enable a user to select a set of data items represented on the display device, and processing means for performing a selected operation on the selected set of data items, the set of components providing a mechanism for providing a per-value interpretation of data to a user of the data processing system and including: one or more application components adapted to display data on the display device; one or more processing components, responsive to user selection of an operation to be performed and user selection of a set of an application component's data values, for processing the selected set of data values to generate a result; wherein said one or more processing components have means for generating per-value interpretation information corresponding to said generated result, and for providing said interpretation information to the application component for display to the user; and a connection component enabling communication between said one or more application components and said one or more processing components.

BRIEF DESCRIPTION OF DRAWINGS

Preferred embodiments of the present invention will now be described in more detail, by way of example, with reference to the accompanying drawings in which:

FIGS. 11a and 11b are representations of the interfaces and classes relevant to SmartMarker and Palette Java Beans according to an embodiment of the invention.

DESCRIPTION OF THE PREFERRED EMBODIMENTS

System Components

Figure 1:
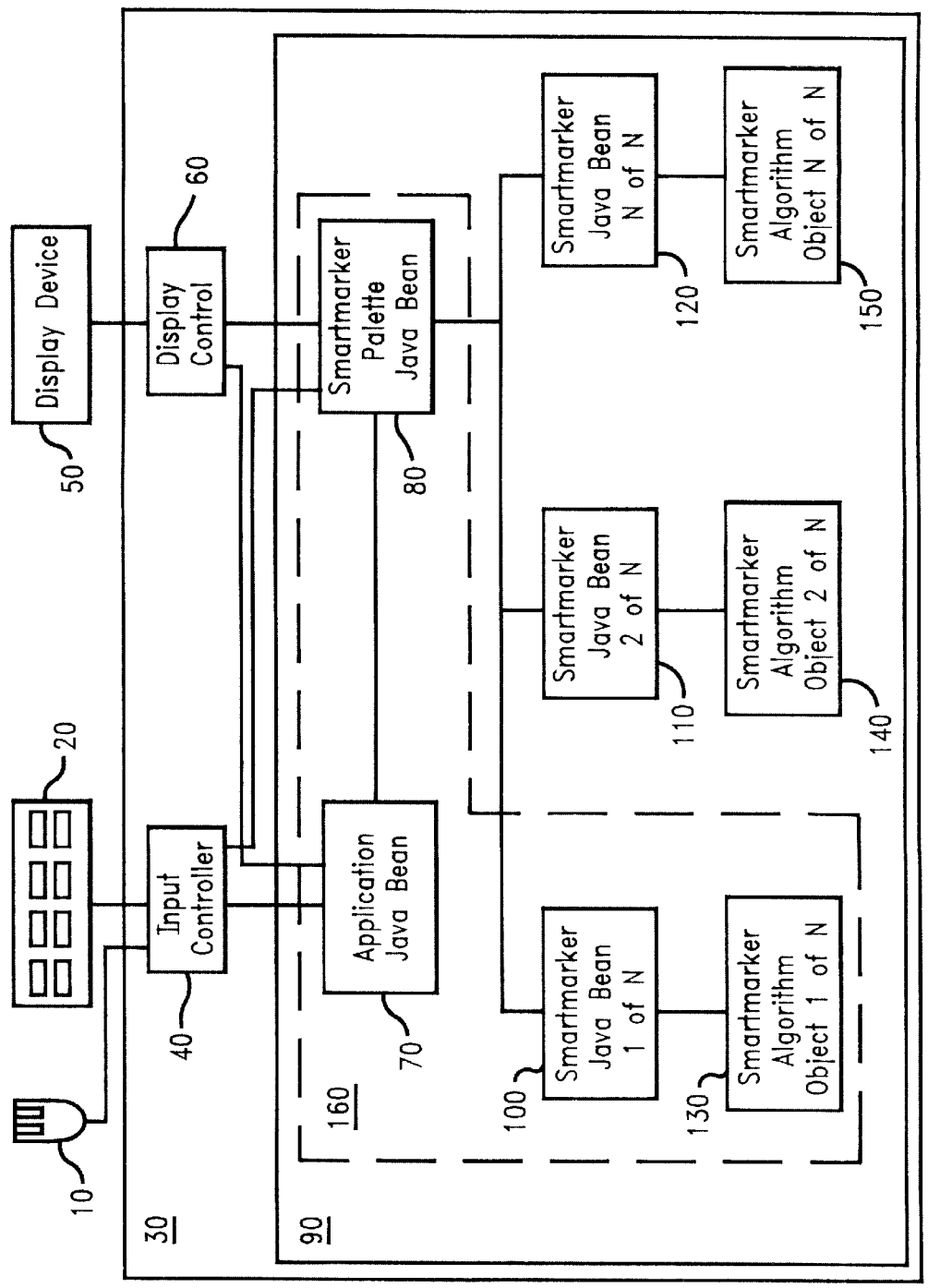
FIG. 1 is a schematic representation of a data processing system including software components implementing the invention according to a first embodiment.

FIG. 1 is a schematic block diagram illustrating a data processing system in which the invention is implemented. A mouse 10 and keyboard 20 are input devices connected to the data processing system 30 via an input controller 40. A display device 50 is connected to the system to receive data via a display controller 60 for display to a system user. An example software application component 70 running on the data processing system employs a graphical user interface to display its data values on the display device 50. For example, the application component may be a spreadsheet which displays a grid arrangement of rows and columns containing numeric data values, or may be a word processor displaying unstructured text, or any other application that presents information to a user. The memory in which the application component and the data managed by the application component are stored may be a hard disk device within the data processing system, or an external storage device connected to the system.

In the preferred embodiment of the invention, application components 70 are constructed from component building blocks such as Java Beans™, which are self-contained software component objects written in the Java™ programming language and which can be combined with other Java Beans to perform a task when run on a computer with the support of a Java Virtual Machine (JVM) 90. Java application programs and applets are known in the art to execute as a set of objects within a Java Virtual Machine within a Web Browser or other Java run-time environment. Objects within the same JVM can establish connections with each other by calling static methods on the classes associated with other objects. Static methods are methods associated with a class rather than an instance of the class.

A data processing system may have many software application components 70 installed thereon, any number of which may present data to a user on the display device 50 via the display controller 60. The display controller includes hardware and operating system software components which are used to pass data to the peripheral display device, as is known in the art.

A user can interact with an application component which manages displayed data to manipulate that data. The input controller component 40 controls the position of a pointer on the display device 50 in response to signals from the input devices, and the application component implements mouse listener interfaces for identifying and interpreting selection of data items. As is known in the art, an interface in this context is an abstract, named definition of a set of methods. The definition includes the name, return type, and signature for each method but the actual implementation of the methods is specific to the class which implements the interface. Any class that declares itself as implementing an interface is obliged to provide an implementation of each method in that interface. This means that one class can determine the functions provided by another class simply by querying the names of the interfaces that have been implemented.

Conventionally, processing operations that could be performed on data displayed by an application program were implemented as a set of routines within sequential code of the application program. However, it is also known for the operating system of a data processing system, or one of its components such as a Java Virtual Machine, to support an object oriented environment and for a plurality of processing operations to be implemented as separate objects, each object being an instance of a particular class that defines the operation type as a set of methods and properties.

SmartMarker Design

According to the preferred embodiment of the present invention, a set of processing operations known as SmartMarkers are implemented as "invisible" Java Beans 100, 130,110,140,120,150. "Invisible" in this sense means that, although the objects may be represented by separate graphical elements or "icons" at application design time, they are represented at run time by a menu list within a palette displayed on a display device rather than by separate screen icons. This palette 80 is itself implemented as a "visible" Java Bean which operates within the same JVM 90. The SmartMarker operation selection palette Java Bean 80 thus allows the user at run time to select a SmartMarker operation Java Bean 100,110,120 from a list using a mouse 10. The SmartMarker palette object 80 identifies selections in response to mouse events. The use of a palette ensures that the run time representation of the SmartMarker operations takes up minimal screen space and indicates to end users that the SmartMarker operations are conceptually associated with each other and are distinct from any unrelated operations. This mechanism for item selection within a GUI and various alternatives are well known in the art.

SmartMarker operation Java Beans can be selected by an application designer for inclusion within particular application programs or applets. Java Beans can be manipulated visually at design time (for example, dragging an icon to a workspace and setting properties). The designer assembles the application program 160 from selected SmartMarker operation Java Beans and other Java components using a visual builder tool (such as Lotus BeanMachine™ or programmatically by calling methods on the objects associated with the components. As is known in the art, Java Beans implement an interface which enables a visual builder to obtain information about them and the visual builder greatly simplifies application assembly by handling the mechanics of connecting the Java Beans for communication. Standard Java static methods can then be used to establish communications between the objects (since the objects are all within the same JVM).

Each SmartMarker is responsible for a specific data interpretation operation or data generation operation that processes a set of data values supplied by a SmartMarker-enabled application Java Bean and calculates a set of results. The results may be, for example, emphasis colours and/or annotation, as will be described below. For example, an Average SmartMarker determines whether application data values within a selected set are above, close to or below an average and then either selects emphasis colours to apply to the values to represent these categories and/or generates annotation strings interpreting individual values; whereas the Trend SmartMarker calculates whether values are higher or lower than the previous value and then selects colours and/or generates an annotation result to reflect this calculation result.

The logic that defines a SmartMarker operation is coded in a SmartMarker algorithm object 130,140,150 associated with the SmartMarker Java Bean 100,110,120. A SmartMarker Java Bean represents a single SmartMarker within the palette Java Bean 80. Each such bean has a number of properties including title and algorithm name. This algorithm name property defines the class name of the algorithm object to be associated with the SmartMarker Java Bean. During initialisation of the SmartMarker Java Bean, this class name is used to construct an instance of an algorithm object to be executed later when a user selects the SmartMarker Java Bean and selects a set of values.

Algorithm objects 130,140,150 implement SmartMarker interface Algorithm which interface defines a set of methods that will be called on an algorithm by a SmartMarker connection 170 (described below under 'Application Design').

The implementation of SmartMarker algorithms as separate objects from their associated SmartMarker objects enables certain SmartMarkers with different properties to use the same SmartMarker algorithm object for the generation of different interpretation results. Nevertheless, many SmartMarker algorithm objects are only associated with a single SmartMarker object (and so in alternative embodiments of the invention the SmartMarker and SmartMarker algorithm for these operations could be implemented as a single object).

To implement the Algorithm interface, an algorithm object:

implements method getSmartMarkerAttributes( ) to enable other parts of the SmartMarker operation model to retrieve information about the current SmartMarker (its detailed properties or attributes such as a set of direction-of-processing options displayed in the user interface);

implements method calculateResults( ) to:
  accept a value set containing a set of selected values supplied by the application component Java Bean;
  extract value objects of a specific data partition from that value set (e.g. the partition may be a row, column, or block within a table of application data values, this partition being determined by a processing Direction option within the properties of the current SmartMarker);
  perform calculations upon these extracted values to generate a set of results;

optionally, an algorithm object then calls methods on some or all of the value objects to set an associated emphasis colour result and/or calls methods on some or all of the value objects to set an associated annotation result. These setEmphasis and setAnnotation methods are implemented within class ValueBase, which is the base class for classes that represent values or sets of values passed to the algorithm (Value, ValuePartition, and AlgorithmValueSet), and allow the algorithm to set a result on a specific value or set of values.

When the algorithm has completed execution of method calculateResults, the following methods are called on the application (these methods are defined in mandatory application interface SmartMarkerEnabler, and optional application interfaces EmphasisColor and Annotation).

SmartMarkerEnabler.startResults

Notifies the application that a set of results are about to be supplied. Typically implemented by the application to initiate housekeeping tasks such as clearing colours applied by prior interactions with an algorithm.

EmphasisColor.applyEmphasisColor
　Called once for each value supplied to the algorithm upon which the algorithm has called ValueBase.setEmphasis. Typically implemented by the application to associate the colour specified in the result with the value identified by the value key in the result. These colours are then displayed by a repaint operation triggered by a subsequent call to SmartMarkerEnabler.endResults.

Annotation.applyAnnotation
　Called once for each value supplied to the algorithm upon which the algorithm has called ValueBase.setAnnotation. Typically implemented by the application to associate the annotation string specified in the result with the value identified by the value key in the result. Each such annotation string may subsequently be displayed in response to subsequent mouse proximity to the associated value.

SmartMarkerEnabler.endResults
　Notifies the application that all results have been sent. Typically implemented by the application to initiate repainting of the data using any colours specified in emphasis results.

As well as calling methods on a SmartMarker algorithm object, and implementing methods for setting annotations and emphasis colours, the respective SmartMarker object 100,110,120 has a set of properties including its name and a number of options including:

the type of partition of a selected data set to be analysed (e.g. single value, row, column, array),
　a set of emphasis colours to be applied, for example red, yellow and green,
　a set of text strings used as a key to interpret emphasis colours (i.e. each text string being applicable to one category of possible results), FIGS. 8 to 11 are listings of the full set of methods for each interface relevant to the different components of the system.

Thus, a SmartMarker algorithm operates upon values supplied by a client application component and returns a set of calculated results associated with those values which are used by the SmartMarker object to generate interpretation annotation strings which are returned to the application component.

Within the algorithm, each supplied value is represented by an instance of class Value. Class Value contains both the actual value and keys (such as row and column numbers) that enable the client application to recognize the source of the value. Values are grouped into partitions where each partition represents a row, column, or block. Each partition is represented as an instance of class ValuePartition. Value partitions are grouped into a single value set represented by an instance of class ValueSet.

An algorithm may return several types of results including colour changes, and annotations. To return a result for a value, the algorithm calls an appropriate method on an instance of class Value. To return a result for all values in a partition, the algorithm calls an appropriate method on an instance of class ValuePartition. To return a result for all values, the algorithm calls an appropriate method on an instance of class ValueSet.

The respective methods for generating annotation strings are:
Value.setAnnotation(String annotation)
ValuePartition.setAnnotation(String annotation)
ValueSet.setAnnotation(String annotation)

For typical operations, a SmartMarker object will return the results for all values in a selected set, which the application then stores. Display of annotation strings for individual data values then requires subsequent data value selection by movement of the mouse pointer to overlay the relevant cell of the application component data grid.

The setting of annotation strings comprises mapping each numerical result of the calculation performed by the SmartMarker algorithm to one of a set of defined result categories specific to the current SmartMarker operation. Each category has an associated text string held as a property of the SmartMarker object. The setAnnotation method includes generating a text string which combines the text of the identified category with the numerical result of the calculation. Examples of this generation will be described below under 'Example Operations'.

Application Design

Figure 2:
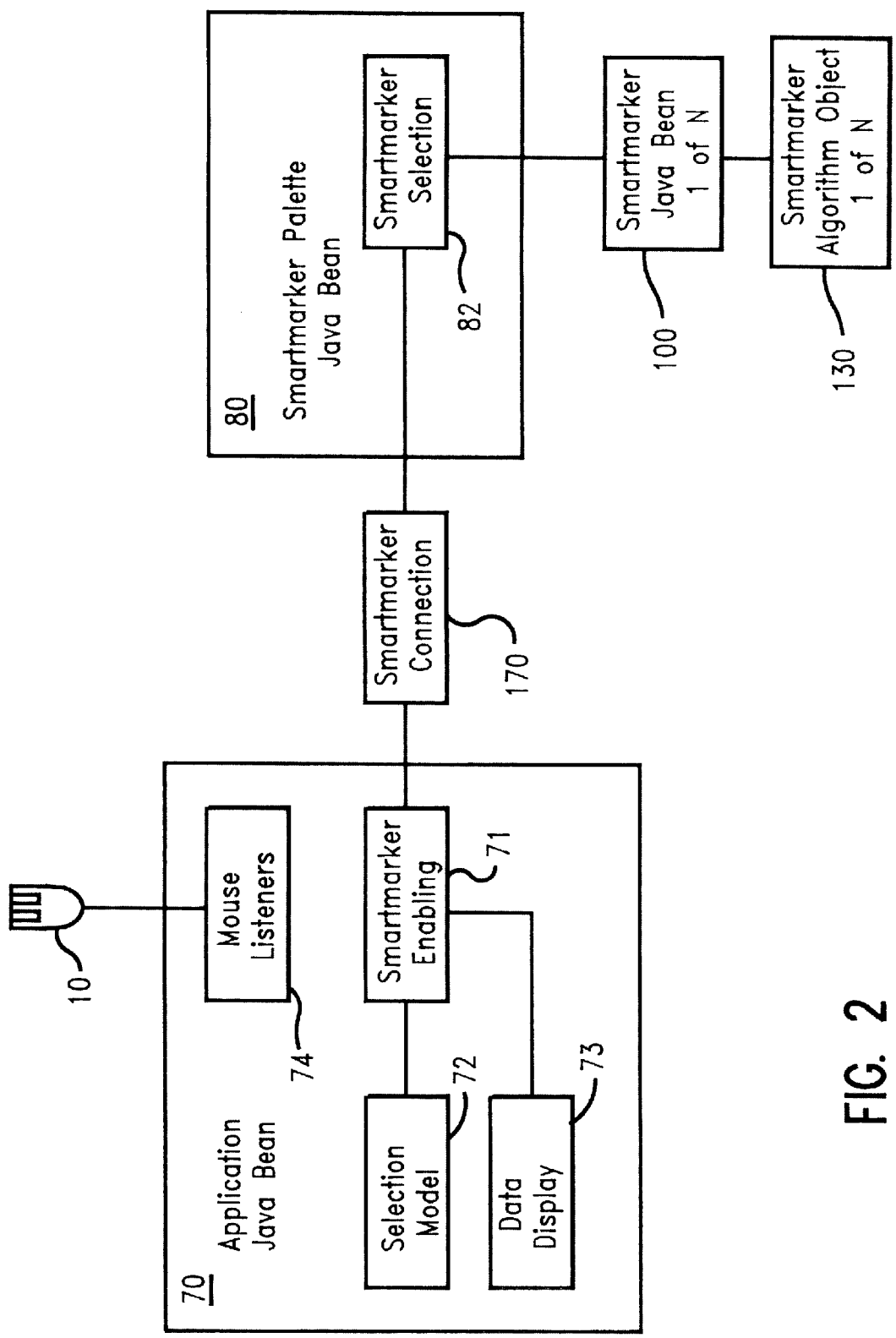
FIG. 2 is a more detailed representation of components implementing the embodiment shown in FIG. 1.

Referring to FIG. 2, an application component Java Bean 70 is enabled to support SmartMarkers by establishing a SmartMarker connection 170 (i.e. the application component creates an instance of class SmartMarkerConnection) and implementing a number of Java interfaces 71 associated with SmartMarkers. The connection 170 enables the application to collaborate with the SmartMarker palette Java Bean 80 and the SmartMarker Java Beans 100,110,120 and their associated SmartMarker algorithm Java Beans 130, 140,150 within the palette. The application establishes the connection by creating an instance of class SmartMarkerConnection. On startup, the application component calls method SmartMarkerConnection.makeConnection on the connection object. On termination, it calls method SmartMarkerConnection.severConnection.

The application also uses the connection 170 to coordinate the flow of data and results between itself and the algorithm associated with the selected SmartMarker. Whenever a SmartMarker is selected in the palette, the connection calls method SmartMarkerEnabler.setValueSet to provide a value set into which the application can subsequently place selected values. When the application calls method ValueSet.setComplete, the connection sends the value set to the algorithm, initiates processing by the algorithm, and returns a set of results calculated by the algorithm. These results are returned to the application through calls to SmartMarkerEnabler.startResults, EmphasisColor.applyEmphasisColor, Annotation.applyAnnotation, and SmartMarkerEnabler.endResults. Each of the above calls to applyEmphasisColor or applyAnnotation passes a single result object to the application. This result object contains both the actual result and key information that enables the application to correlate that result to a value previously stored by the application in the value set.

By calling the method SmartMarkerConnection.makeConnection, the application registers itself as a listener to SmartMarker-related events such as the user opening and closing a SmartMarker in the palette. For example, by registering as a listener, the application ensures that it receives a call to method SmartMarkerEnabler.smartMarkerClosed whenever the user closes a SmartMarker in the palette.

The application component or components 70 are implemented as "visible" Java Beans which implement interfaces for interoperating with the SmartMarker processing operation Java Beans 100,110,120. In particular, to interoperate with members of the set of SmartMarker components, an application component 70 implements the following Java interfaces:
　MouseListener
　MouseMotionListener ComponentListener
SmartMarkerEnabler
Annotation
EmphasisColor Interface MouseListener is a standard Java AWT interface that enables a component to listen for and respond to events related to mouse clicks. These events include mouse pressed, mouse released, mouse clicked, mouse pointer enters component's screen area, and mouse pointer exits.

Interface MouseMotionListener is a standard Java AWT interface that enables a component to listen for and respond to events related to mouse movement. These events include mouse moved and mouse dragged.

Event listeners are standard design features introduced in Java 1.1 AWT, and are widely used and understood by those skilled in the art (see, for example, the description in Sun Microsystems Inc's Java Development Kit documentation package java.awt.event).

Interface ComponentListener is a standard Java interface allowing the component to identify changes to its properties such as resizing.

Interface SmartMarkerEnabler defines a set of methods that all SmartMarker-enabled applications implement. These methods enable the application to acquire a SmartMarker value set (which is a container for a collection of values to be exchanged between the application component and a selected SmartMarker), to obtain information about attributes such as cursor and marking colour, and to receive notifications related to the state of the SmartMarker and the availability of results. The SmartMarker connection component 170 calls the methods in this interface to enable SmartMarkers to collaborate with the application.

To implement the methods in SmartMarkerEnabler, the application typically:

- extends its selection model 72 such that, if a SmartMarker Java Bean 100 has been selected in the SmartMarker Palette Java Bean 80, the values selected by the user are added to the value set and the value set is marked complete to make it available to the algorithm object 130 associated with the selected SmartMarker Java Bean; and
- extends its data display 73 such that, when notification is received that all results have been received from the SmartMarker, the data display is repainted to reflect those results.

Interface EmphasisColor defines a single method that enables the application to apply a single colour result returned by the SmartMarker. The SmartMarker connection calls this method once for each colour result calculated by the algorithm associated with the selected SmartMarker. Each call specifies a value key and a colour. To implement this method, the application typically uses the specified colour to repaint the value identified by the specified value key.

Interface Annotation defines a single method applyAnnotation that enables the application to apply a single annotation result from the set returned by the SmartMarker. The SmartMarker connection 170 calls this method once for each annotation result calculated by the algorithm associated with the selected SmartMarker. Each call specifies a value, a key and an annotation string (or other annotation type):

value

This represents a value previously supplied to the processing program. The Value class contains both the actual value and a key such as row and column or word number. Client applications may use either the key within value or a native key (see below) to cross-reference a result to a value.

nativeKey

This represents a native key previously supplied to the processing program. A native key is an object reference that is meaningful to the client application. It is provided as a convenient alternative to the key defined in class Value. Where an example application has data arranged in a grid and each cell is modelled as an individual object, the native key might refer to an instance of a Cell class.

annotation

This is the actual string to be displayed when the mouse pointer is over the specified value.

The client application programs that support the Annotation operation are adapted to receive the per-value interpretation results from the SmartMarker object, to save the annotation string results in memory in association with the respective application-managed data values, and then subsequently to display the interpretation results using the known Bubble Help mechanism in response to mouse pointer proximity to the data values. Mouse proximity is detected by methods implementing the mouse listener interface 74 using the specified value key.

The applySmartMarkerAnnotation method is called each time the mouse pointer enters a new cell containing application data which is within the set of selected data values, since the application is a listener for mouse movement events. The application uses the key sent with the call to identify a corresponding data value and obtain its position information within a screen of the application (e.g. within a table or sequence of text) and then displaying the annotation string within a 'flyover' text box adjacent the identified position.

Interaction Sequence

Figure 3:
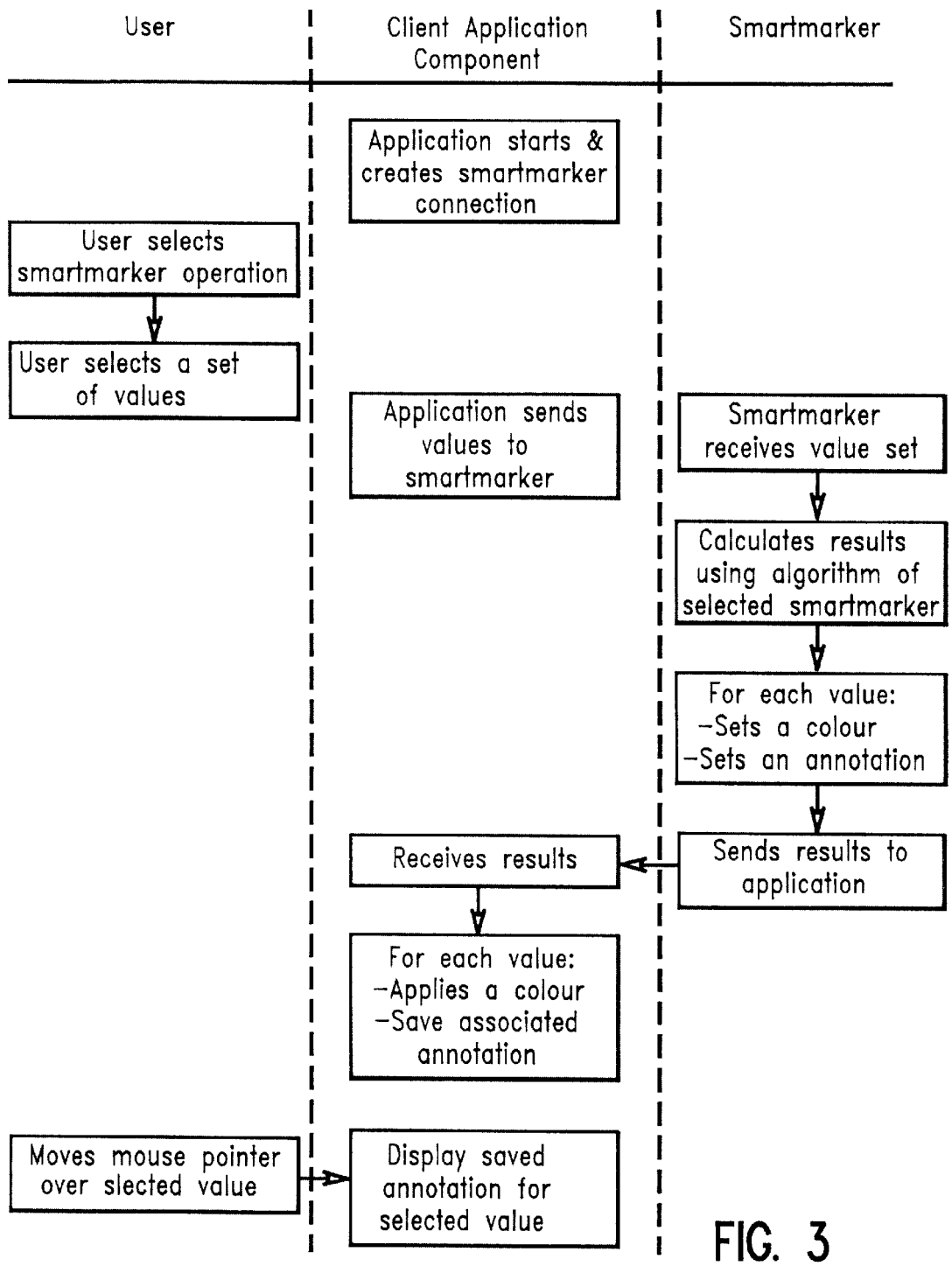
FIG. 3 is a representation of the sequence of events during use of the invention according to the first embodiment.

The sequence of steps of a method implementing the invention will now be described with reference to FIG. 3. Firstly, when a SmartMarker enabled application component 70 starts, it creates an instance of class SmartMarkerConnection. The application component then issues a call SmartMarkerConnection.makeConnection. The connection then calls SmartMarkerEnabler.setValueSet on the application to pass the application an empty value set container.

A user then interacts with the SmartMarker palette 80 to select from a list of operations an operation to be performed. This selection uses standard keyboard or mouse selection techniques. The connection calls SmartMarkerEnabler.setMarkingColor on the application to specify a marking colour (taken from the properties of the selected SmartMarker object) for use to identify user selection. A palette listing SmartMarker operations is shown in each of FIGS. 4a,4b, 5,6,7. The palette object receives a notification of the input device selection, identifies which operation has been selected and then applies a visual indication of the operation selection by shading the background of the operation's list entry using the set marking colour. At this point the user can accept the SmartMarker operation's default properties or select the Direction or Key tabs to edit the properties. The Direction tab presents via the palette a choice of partition type to be processed (row, column or block) and a choice of processing order (left to right, top to bottom, etc). The Key tab presents a listing of the current result categories and their associated text.

Having selected the desired processing operation, the user can then move the mouse pointer under the control of the input control means 40. When the mouse pointer enters a window on the screen in which data managed by the application component 70 is being displayed, the input control means notifies the application component 70 which then accesses its value set container for the exchange of data values. The application calls ValueSet.clear to remove all values from the value set. Having entered the application's window, the user can then select a set of the data displayed in that window, such as a row, a column or a block and the application calls ValueSet.addxxxValue to add selected values to the value set. Techniques for user selection of data items using an input device such as a mouse are well known in the art. For example, a mouse pointer is moved to a first data item (start point) and the left mouse button is depressed, and then the pointer is moved across the screen to a final value (end point) at which the button is released. All of the data values within a screen area defined by the start and end points of the mouse movement are selected. The application component includes methods implementing the standard Java interfaces MouseListener and MouseMotionListener to respond to mouse events, identifying the selection and then storing the selected set of data values as a value set. The application's selection model uses the previously specified marking colour. When all of the selected values have been added to the value set, the application flags the value set as complete by calling ValueSet.setComplete. This marks the value set as ready for processing by the algorithm of the SmartMarker, and initiates that processing.

The SmartMarker's algorithm object receives the value set from the application component and retrieves information about the current SmartMarker (obtaining its detailed properties). The algorithm object then executes the method Algorithm.calculateResults. This Algorithm.calculateResults method extracts value objects from the value set and then performs a set of calculations on the values in the value objects of the value set—i.e. performing the required data interpretation and/or data generation operations on the data values in the Value Set. The nature of these calculations varies according to the purpose of the SmartMarker. The Algorithm.calculateResults method implemented by the SmartMarker algorithm then calls method ValueBase.setAnnotation on each value that requires an annotation result to set an annotation for that value, and calls ValueBase.setEmphasis on each value that requires a colour change to set an emphasis colour corresponding to the results of these calculations, as described above.

The connection then returns to the application component the emphasis colour codes and annotation strings set by the smartMarker object (as described above under 'SmartMarker design' and 'Application Design'), the combination of a colour code and an annotation string comprising an integrated set of results received by the application component for each data value.

The connection calls SmartMarkerEnabler.startResults and the application clears any results applied by previous interaction with a SmartMarker. The SmartMarker connection 170 then calls EmphasisColor.applyEmphasisColor once for each value for which the SmartMarker algorithm has called ValueBase.setEmphasis. The implementation within the application component of EmphasisColor.applyEmphasisColor saves the returned colours in association with the respective data values (referenced by row and column grid positions). The connection also calls Annotation.applyAnnotation for each value for which the algorithm object has called ValueBase.setAnnotation. The implementation of Annotation.applyAnnotationResult within the application component saves the annotation strings. The connection component then calls SmartMarkerEnabler.endResults.

The client application component displays emphasis results through its user interface by applying the emphasis colours to the background of the respective data value cells of the grid—repainting values using colours saved by prior connection calls to EmphasisColor.applyEmphasisColor. In FIGS. 4a to 7, different colours are represented by different hatching of data value cells. The application component Java Bean 70 additionally expresses returned annotation results by showing flyover text in response to the user moving the mouse pointer to overlay a value with an associated stored annotation result string, calling the method Annotation.applyAnnotation once for each value as the value is selected by mouse positioning. The SmartMarker object may additionally display other data such as a chart.

When the application ends, it calls SmartMarkerConnection.severConnection.

Example Operations

As noted previously, a number of different processing operations can be implemented as SmartMarkers, including interpretation operations such as calculating for each value of a selected set whether the value is above or below the average for the set and then marking the values accordingly, or identifying and displaying a ranking of a set of data values.

U.S. Pat. No. 5,896,491 to Englefield which claims priority on WO96/39655 (which is incorporated herein by reference) described interpretation operations in which a colour code or other emphasis is applied to individual data cells of a selected set of data cells within an application program. The color or other applied emphasis represents the relation of each value to the other values in the set. For example, a Rank operation determines an ordering of data values by their magnitude, and the results of the operation may be presented to the user by using different shades of blue for the background of the cell containing each data value in the selected set, with the largest value having the deepest blue background. Englefield mentions that many forms of emphasis are possible as alternatives to background colours.

To implement the Rank operation, the processing program compares all of the values in the set with each other, or compares each with a common value, to determine a ranking by magnitude, and then selects an appropriate shading or other emphasis to apply to each value to represent the relative values. Englefield disclosed implementing this by assigning values to percentile bands with all values in a given band being given the respective shading. The calculation thus perferably determines an actual ranking for each value but this is then represented to the user in a simplified, easily interpreted form.

In some circumstances, it will be highly desirable for the user to be able to confirm the actual position in the ranking of an individual value in addition to (or instead of) being presented with the very easily interpretable colour coding. For example, a user may wish for confirmation that a selected value is within the top 10% of the set of selected values, or that it is ranked third out of 50 values.

The present invention makes possible the provision of such a confirmation to the user. In particular, an alternative mechanism for implementation and data generation operations to that described in Englefield is provided. The new mechanism is also capable of presenting per-value data interpretation information to a computer user. That is, as an alternative or addition to sending to the application component an identification of the required emphasis to be applied by the application program, a SmartMarker processing component according to the invention includes methods for providing annotation strings to the application component, the annotation strings describing the relation of a specific selected value to other values with a particular partition of a selected data set. The application component then displays an annotation string in response to user selection of a respective data value, such as selection by movement of the mouse pointer over the cell containing the value.

In association with the Rank operation described above, the annotation strings which can be returned to the application component for display alongside individual selected values may be strings which simply put into words the same information as is represented by colour codes, such as "within top 10% of values in set", "within bottom 10% of values in set", etc. Alternatively, the strings may be more detailed and give numerical information which cannot be represented by applying colour or other emphasis, such as: "ranked 3rd in row, 25 below highest".

Figure 4A:
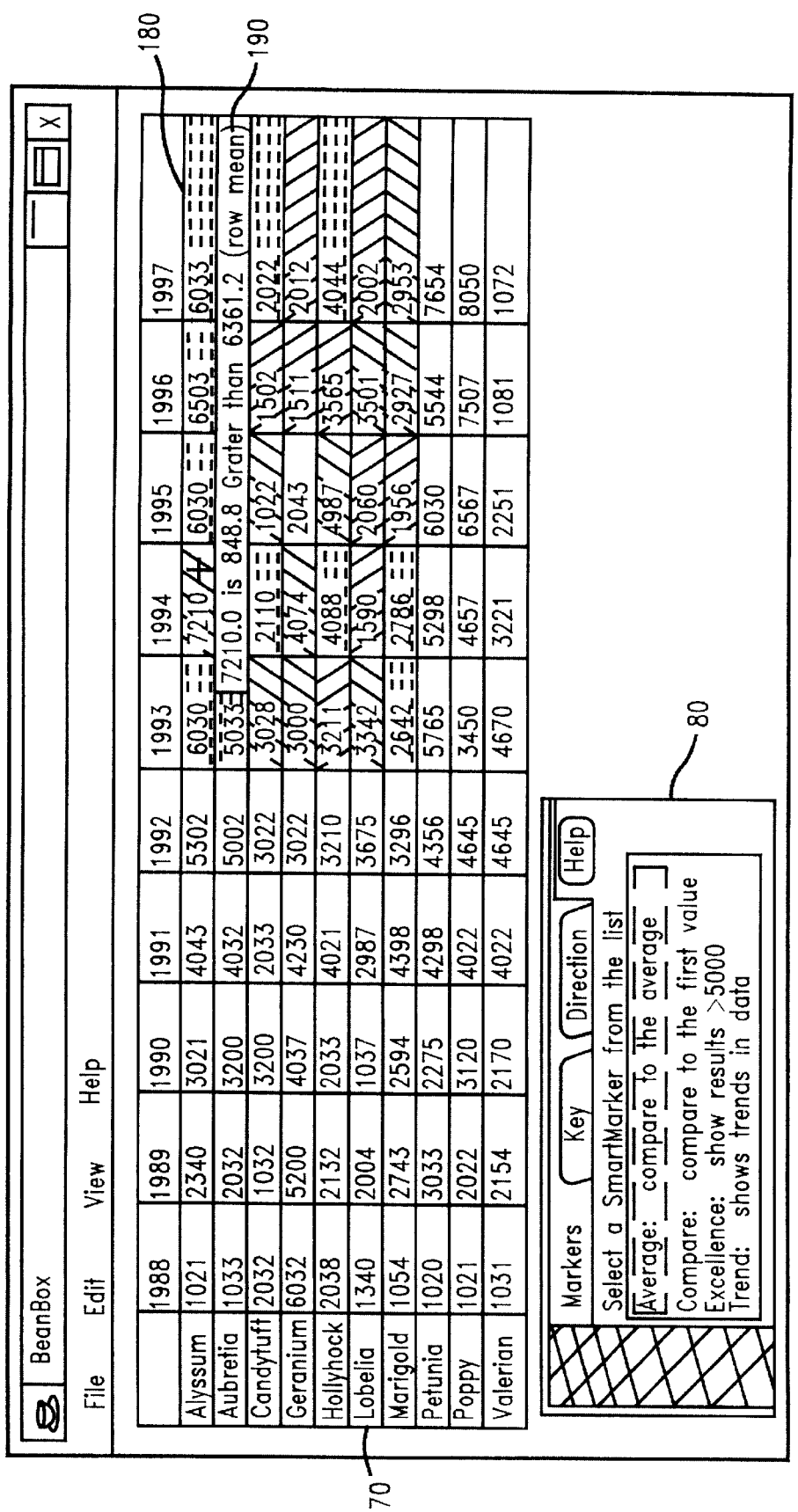
FIGS. 4a and 4b show example computer display screen images for an operation for comparing data values with an average for a selected set of values, each image including an annotation box relevant to the data value at the respective current mouse pointer position.

As another example, FIG. 4a shows an operation selection palette 80 and a spreadsheet application 70 displaying data via a graphical user interface. The spreadsheet application 70 is displaying interpretation results following execution of an Average SmartMarker operation that determines an arithmetic mean for a selected partition of a selected set 180 of data and then compares individual values to the mean. The numerical results of this comparison are assigned to one of a number of categories. These categories may be, for example, the three categories "greater than mean", "within 10% of mean", and "less than mean". Each category has corresponding text stored in association therewith for inclusion within annotation text strings.

If a row of a selected data set has a mean of "M", and an individual value "N" within the selected set is determined to be greater than the computed mean for a particular partition ("Partition1", which is a row, column or block of data values—as specified within the properties of the SmartMarker by selecting the "Direction" tab of the palette 80) by an amount "deltaString", then the Average SmartMarker algorithm initially returns the two intermediate results M and deltaString, and in this case the intermediate results for value N are mapped to the "greater than" category. An annotation string is then generated by the setAnnotation method. This uses the intermediate results M and deltaString and stored text associated with the "greater than" result category as follows:

annotation="N is deltaString greater than M (Partition1 mean)".

This annotation string is then returned to the application component from which the data values were taken. An annotation text string is preferably returned for each value within the selected set of data values and the strings are stored by the application program.

In FIG. 4a, a value 7210 has been selected by mouse pointer positioning (as shown by a cross) and has been compared by the Average SmartMarker with a calculated mean of other values in the row of selected application data values leading to the generation of the annotation string 190:

"7210.0 is 848.8 greater than 6361.2 (row mean)"

The application has displayed this string in response to mouse pointer selection of the data value 7210. The Average SmartMarker shown in the example of FIG. 4a has also returned to the spreadsheet application component 70 a set of annotation strings and a series of selected emphasis colours representing the different categories referred to above. The application has displayed on the screen the emphasis colours for the block of selected data values. The emphasis colours are obtained using the same results of the comparison between individual data values and the other values in the row, and the same categorisation. However, instead of generating annotation strings using text associated with different result categories, the emphasis operation obtains a colour associated with a result category and returns this to the application component for display.

Figure 4B:
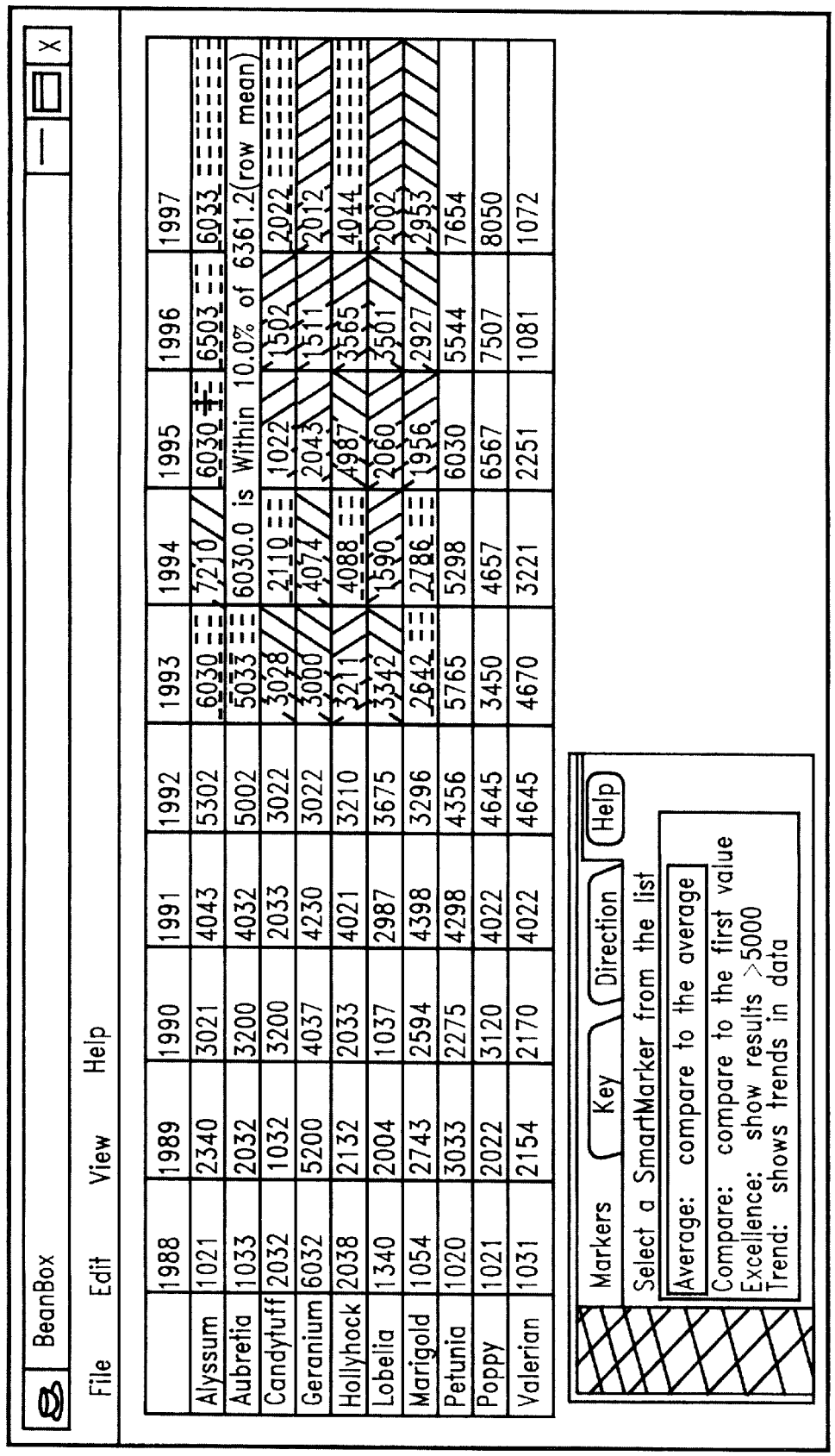

FIG. 4b shows the affect of moving the mouse pointer to a different data value within the same partition of the selected data set—a different annotation string, which has been stored by the application component following its generation by the Average SmartMarker, is displayed.

Thus, the methods applying emphasis colours for the Average operation provide a visually intuitive categorisation of specified partitions of a selected set of results and the methods for presenting annotation information provide supplementary information which assists user interpretation and saves the user from mental arithmetic.

An annotation operation can thus be provided in association with an emphasis-applying operation implemented by a single processing component, for processing data values supplied by a client application component and returning the generated results to the application component. Alternatively, annotation may be implemented independently of emphasis.

Figure 5:
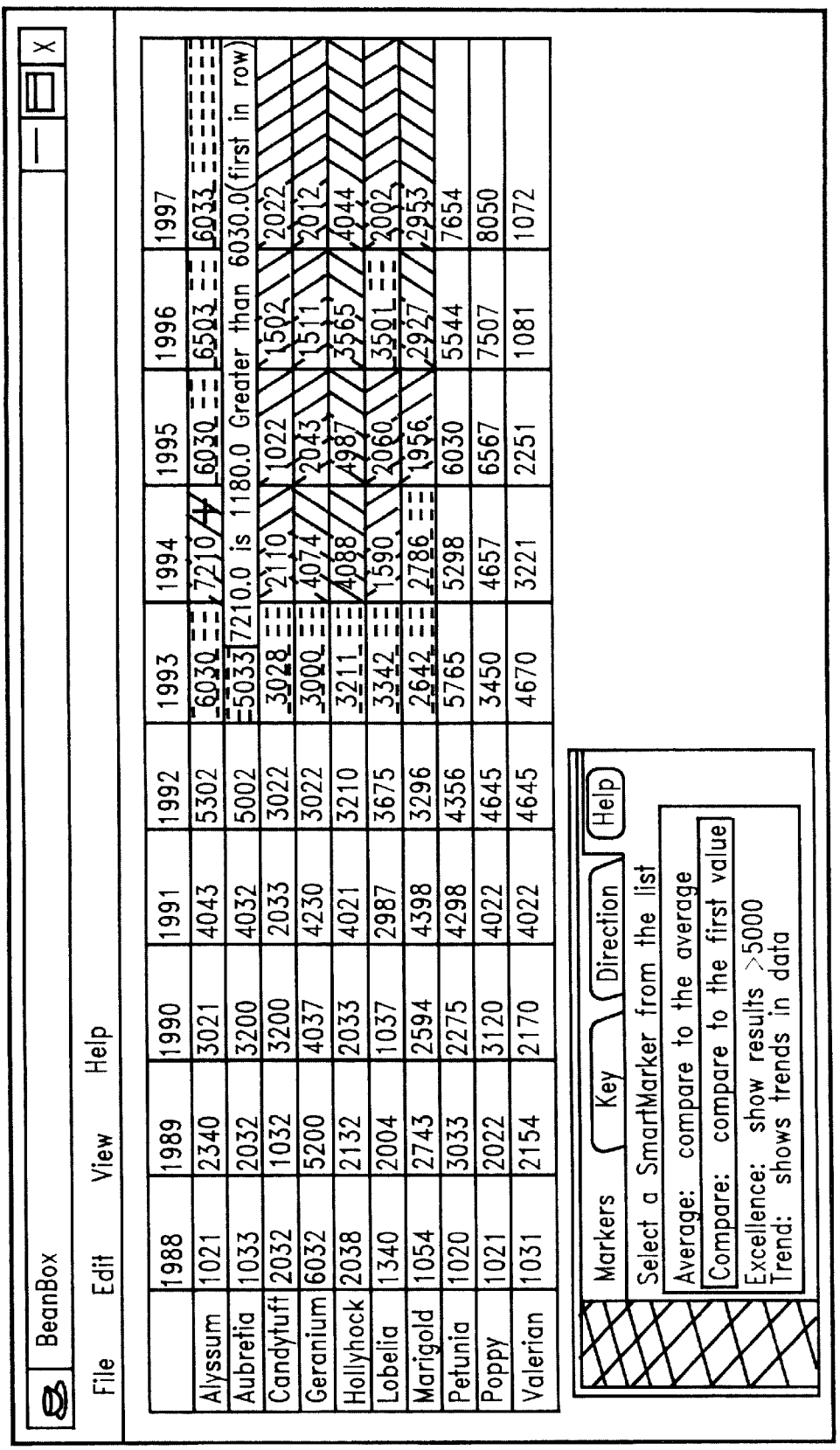
FIG. 5 shows a further example display screen image for an operation which compares data values with the first value in the row, including an annotation box relevant to the data value at the current mouse pointer position.

A third example is shown in FIG. 5. This represents a Compare operation, which compares each value with the first value in the row, column, or block (which partition being determined by the 'Direction' property of the SmartMarker). The positioning of the mouse pointer over the value 7210 has been identified by application component which is a listener for mouse events. The application component has then called the applyAnnotation method on this data value to present its stored annotation string. The annotation strings generated by the SmartMarker object and stored by the application component in response to selecting this Compare SmartMarker operation and selecting a set of data are of the form:

annotation="N is deltaString greater than N1 (first in Partition1)"

where deltaString is in this case the result of subtracting the first value in the row (N1) from the current selected value (N). Partition1 is, once again, the row of the selected data set which contains the current selected value. Emphasis colours represent whether each value is greater than or less than the first value in the row.

Figure 6:
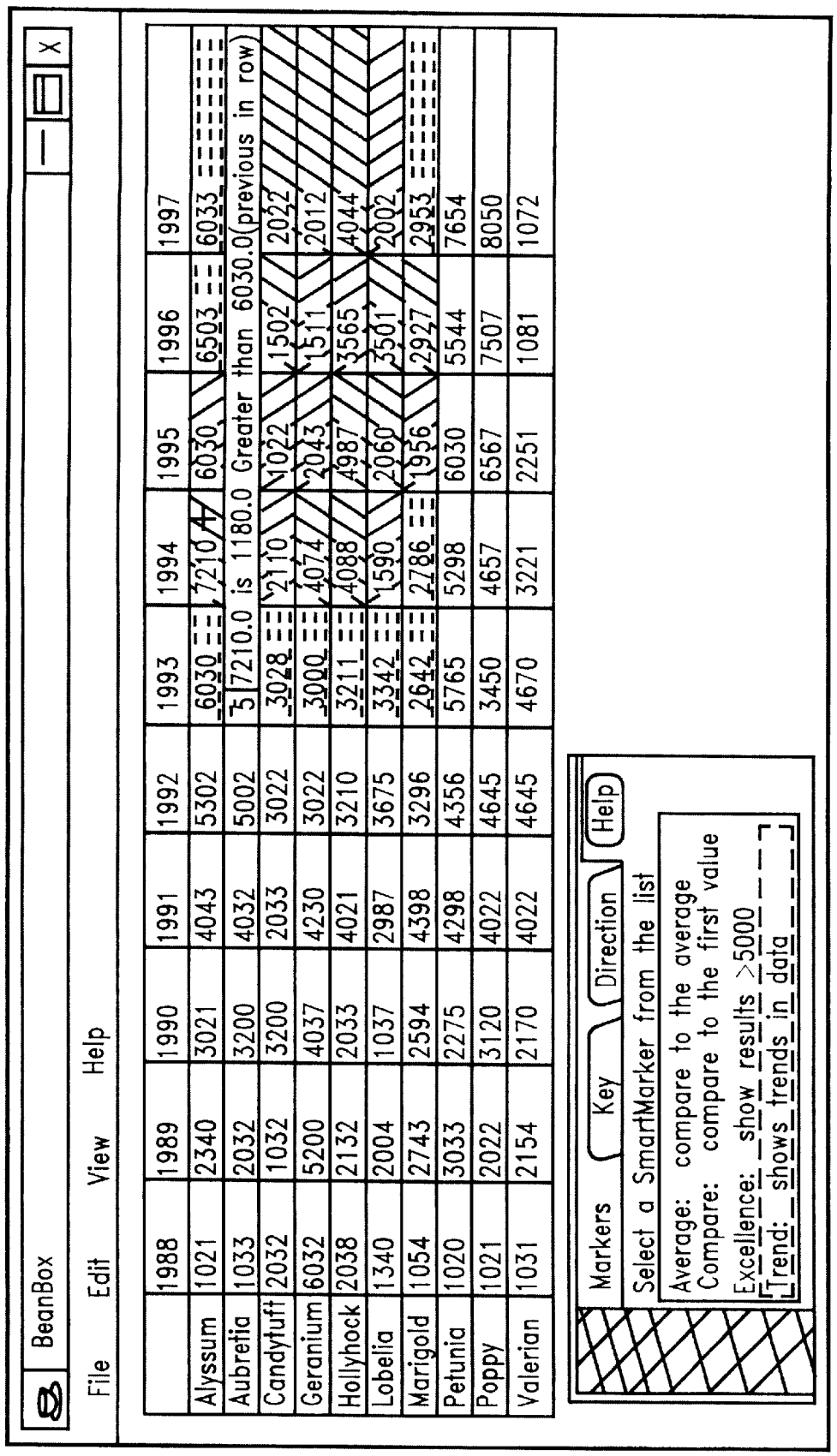
FIG. 6 shows a further example display screen image for an operation which compares data values with the previous value in the row, including an annotation box relevant to the data value at the current mouse pointer position.

FIG. 6 represents a Trend operation, which compares each value in a selected set with the previous value in the partition (in this case, a row, ordered from left to right). Emphasis colours indicate whether each value in a row of a selected set of values is less than or greater than the previous value, and the annotation result provides alphanumeric interpretation information describing the difference between the two values. This can be very useful in aiding the interpretation of trends within data.

Figure 7:
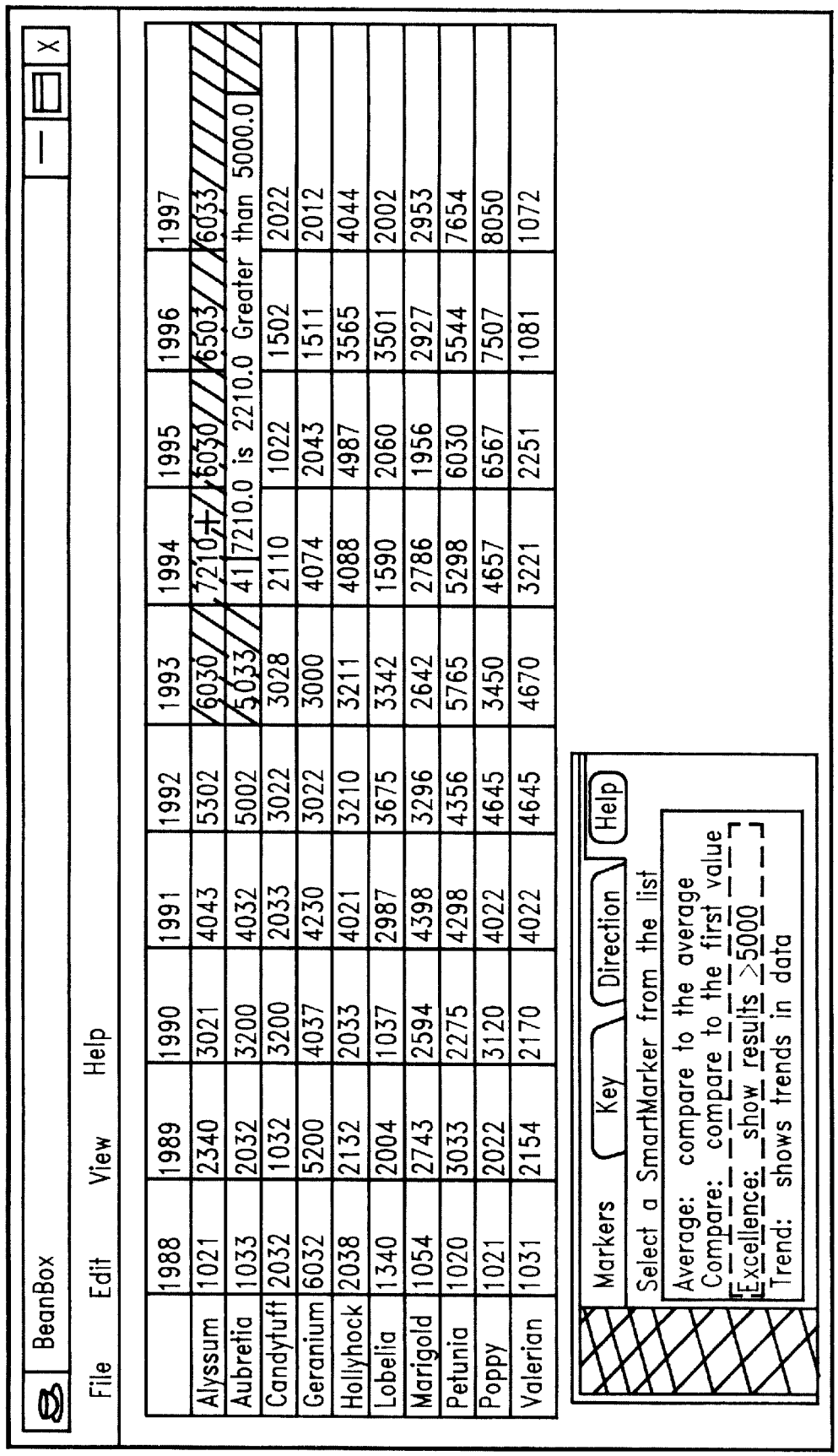
FIG. 7 shows a further example display screen image for an operation which identifies values larger than a fixed value, including an annotation box relevant to the data value at the current mouse pointer position.
Figure 8:
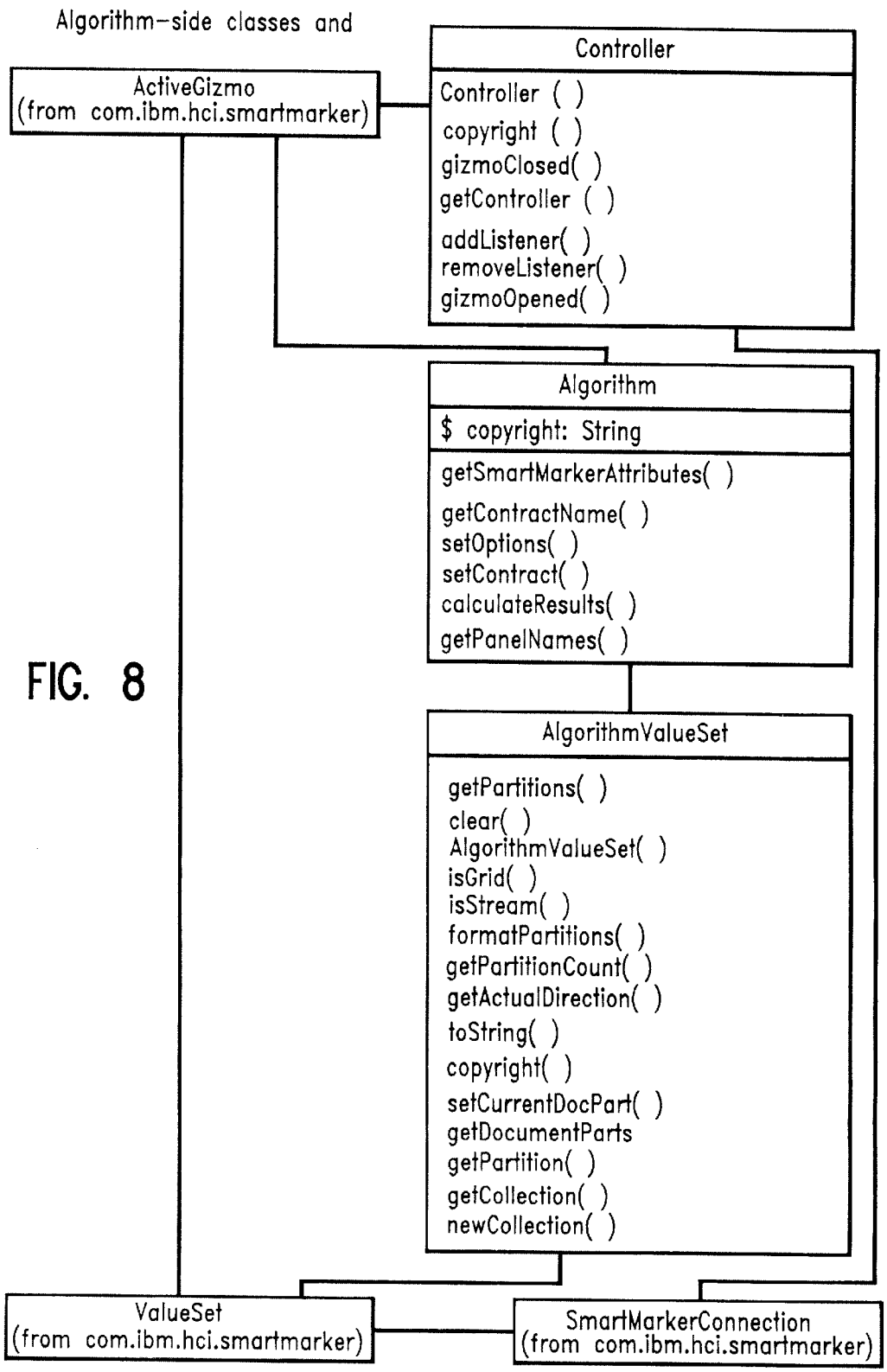
FIG. 8 is a representation of the interfaces and Java classes relevant to a SmartMarker algorithm according to an embodiment of the invention.
Figure 9:
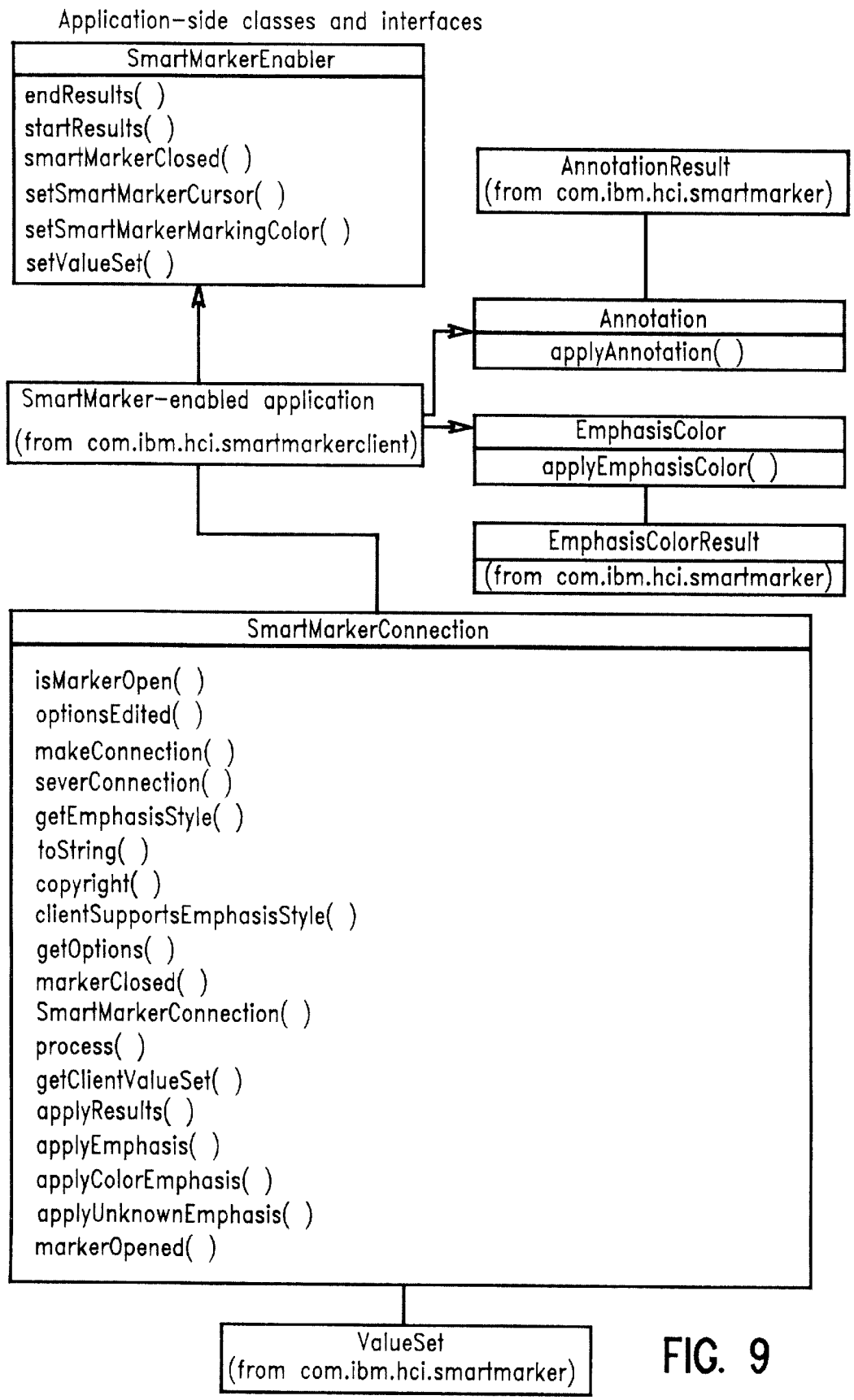
FIG. 9 is a representation of the interfaces and classes relevant to an application component according to an embodiment of the invention.
Figure 10A:
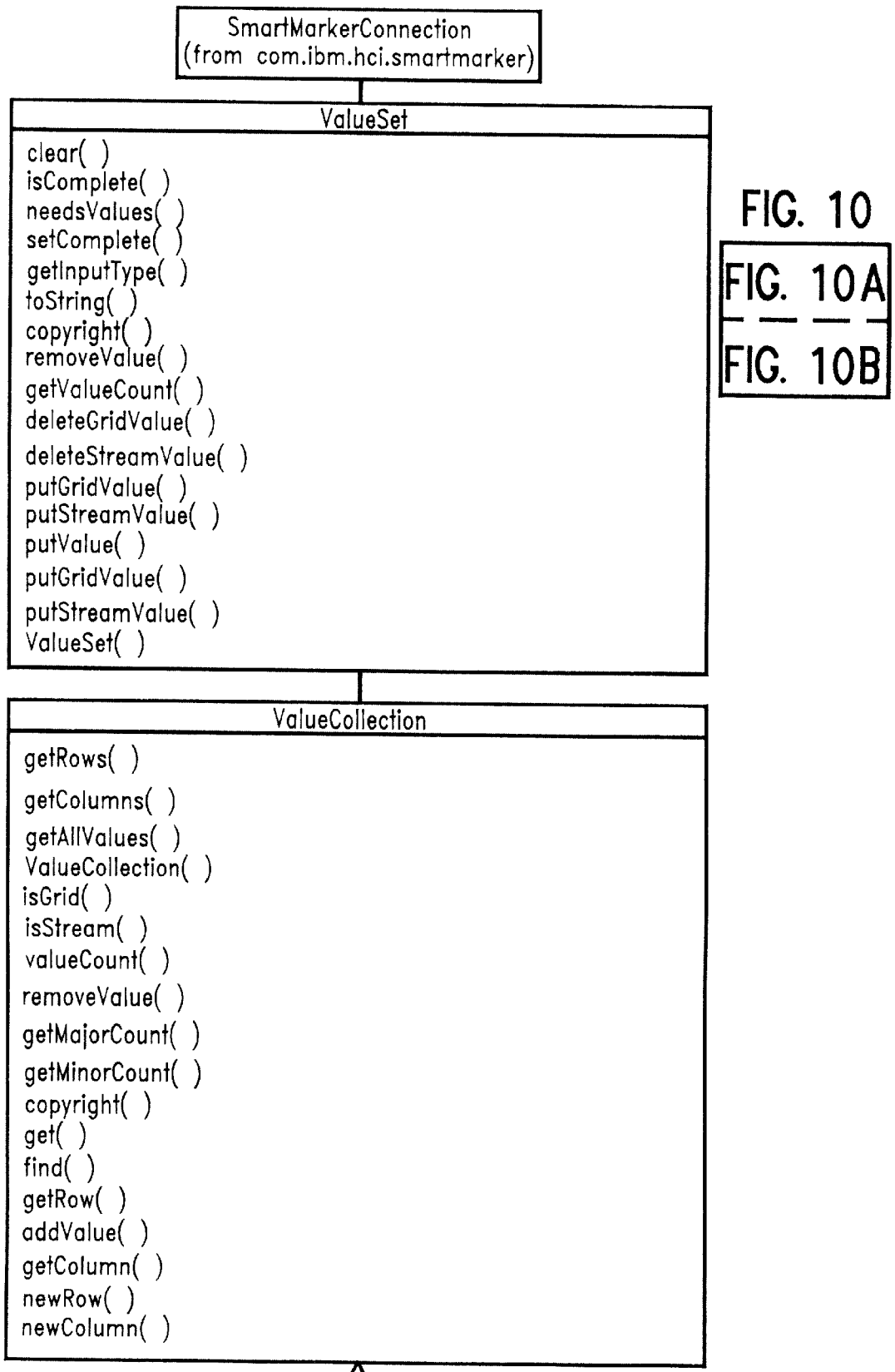
FIG. 10 is a representation of the interaces and classes relevant to values, value sets and results according to an embodiment of the invention.
Figure 10A:
Figure 10B:
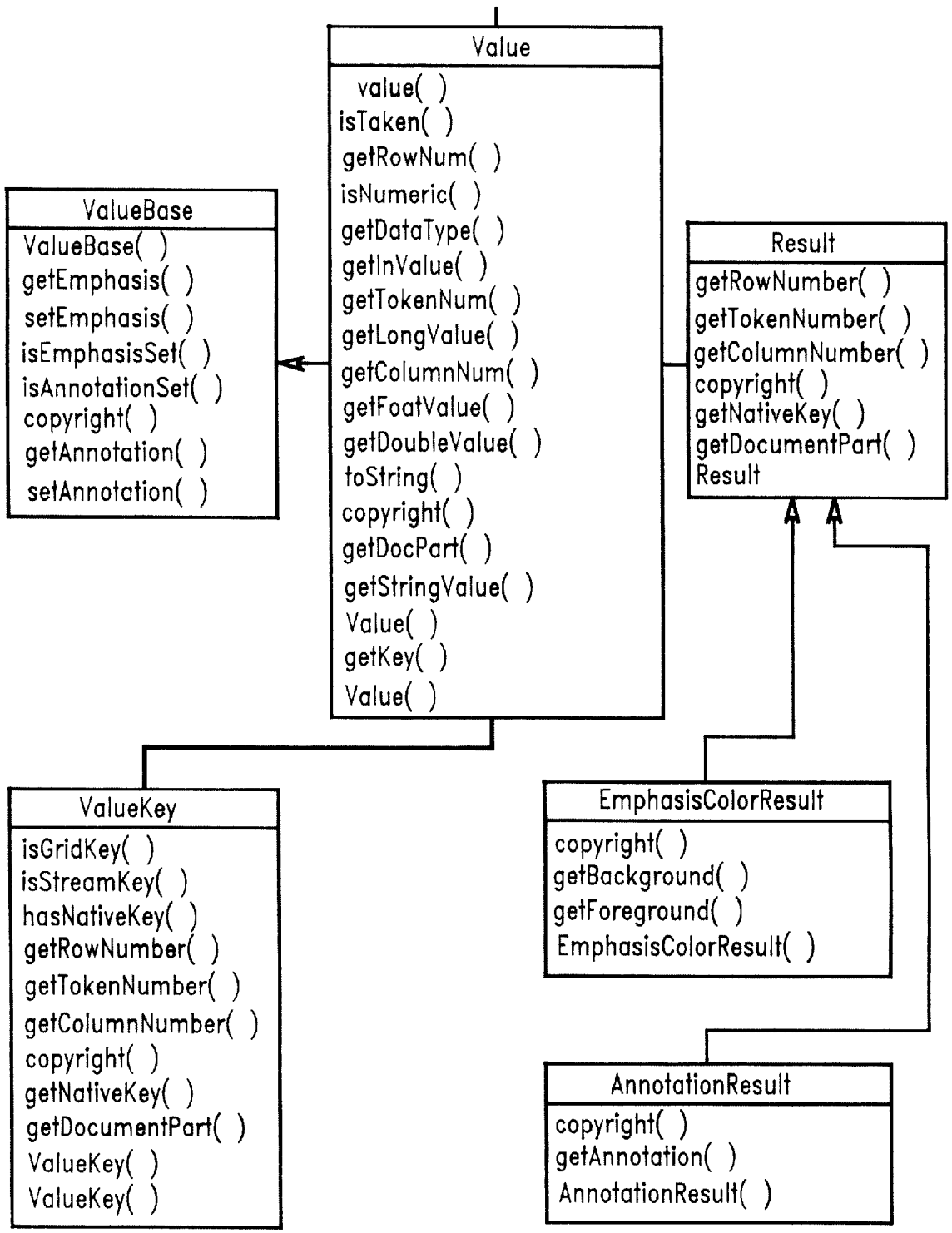

FIG. 7 shows an alternative SmartMarker operation which compares each value in a selected set with a specific reference value and highlights only those results which are greater than the reference value. In this operation, data values have been selected as a block and the numerical intermediate result of the calculation is a number by which each individual value exceeds the reference value. The SmartMarker assigns positive results to a "greater than" category and generates an annotation string such as is shown in the example of the Figure. For this example, no emphasis colour is applied to data values which had a negative result when compared with the reference value, simplifying the presentation to the user. Alternatively, it is possible to mark all values to remind the user which set of values was selected and to apply different emphasis colours to positive and negative results.

Further operations include a Total SmartMarker which uses annotation to display the total of all values in each row or column (such as, for example, "Row total 327"). This is an example of annotation providing useful interpretation information which is relevant to the current operation and the current data values of a selected set and which is implemented independently of emphasis colours.

A WordCount SmartMarker uses annotation to display a count of the words in a selected block of text (such as, for example, "123 words").

Statistical analysis SmartMarker and chart generator SmartMarker are examples of data generator SmartMarker operations which may also benefit fro interpretative annotation.

It will be clear to persons skilled in the art that many different operations can be implemented using methods and mechanisms according to the present invention. In some cases the display of interpretation information will be most helpful to users if implemented together with applying per-value emphasis to represent categories of results, but in other cases the display of per-value interpretation information will be most useful if implemented as flyover text or some other media without additional emphasis. The per-value interpretation information can take many forms and even be presented via different media types as alternatives to the screen display of text strings described in detail above.

The algorithms used by SmartMarkers according to the preferred embodiment are independent executables shared by all enabled applications. This means that a client application requires only a small amount of generalized SmartMarker enabling code. SmartMarker objects can then be enhanced and additional SmartMarkers can be provided without having to modify the applications that use them. Providing analysis through shared SmartMarkers also reduces the overall footprint of application components, avoids duplication and enables greater consistency across different applications. This model also makes it practical to add analysis facilities to non-analytical application components such as word processors, groupware, and databases.

What is claimed is:

1. A set of components for providing per-value data interpretation information to a user of a data processing system which has an input controller responsive to signals from an input device for moving an input device pointer on a display device, the set of components including:
    an application component for displaying data values to the data processing system user;
    a processing component responsive to user selection of an operation to be performed and responsive to user selection of a set of the application component's data values to
        (a) perform the selected processing operation on the selected set of data values to generate a result,
        (b) generate per-value interpretation information corresponding to said generated result, and
        (c) provide said per-value interpretation information to the application component for display to the user;
    wherein the application component is responsive to positioning of said input device pointer, subsequent to said provision of generated interpretation information, to
        (d) identify a specific data value of said selected set in response to movement of the input device pointer into a display area displaying the identified specific data value, and
        (e) display to the user the generated per-value interpretation information for the specific data value on a display device connected to the data processing system.

2. A set of components according to claim 1, wherein said processing component includes logic for comparing each data value of a selected set with other values in the set or with a reference value and for generating a result for each value indicative of a relationship between the respective value and said other values in the set or the reference value, respectively, and
    wherein generated said per-value interpretation information is adapted to generate information descriptive of said relationship.

3. A set of components according to claim 2, wherein said processing component includes logic for comparing the identified specific data value with the other data values within a predefined partition of the selected set which partition includes the identified specific data value.

4. A set of components according to claim 1, wherein the application component displays the generated per-value interpretation information as flyover alphanumeric text.

5. A set of components according to claim 4, wherein the alphanumeric per-value interpretation text is generated by combining the generated result of processing the selected set of an application component's data values with stored explanatory text which is predefined as corresponding to a result category of said generated result.

6. A set of components according to claim 1, wherein the application component displays the generated per-value interpretation information as alphanumeric text within a status line message.

7. A set of components according to claim 1, wherein said processing component is one of a plurality of processing components each comprising a processing object class instantiable to provide objects within an object oriented processing environment, said objects generating the per-value interpretation information, said objects being adapted to interface with application components comprising additional objects adapted to interface with the processing objects such that data values can be provided from an application component to the processing object and interpretation information can be returned from the processing object to the respective application component.

8. A set of components according to claim 7, including a connection class instantiable to provide a connection object for managing the flow of application data, processing results and interpretation information between application components and processing objects.

9. A set of components according to claim 7, wherein each processing object comprises a controller object and an associated algorithm object, the controller object being adapted to make calls to the algorithm object to perform a calculation on selected data values to generate a result and the controller object being adapted to generate per-value interpretation information using said result.

10. A set of components according to claim 7, wherein said processing object classes each comprise one or more Java Beans.

11. A set of components according to claim 1, wherein said generation of per-value interpretation information comprises initiating a database lookup operation using a selected data value as an input parameter for controlling said database lookup operation.

12. A set of components according to claim 1, wherein said processing component includes logic for comparing each data value of a selected set with other values in the set or with a reference value and for generating a result for each value indicative of a relationship between the respective value and the other values in the set or the reference value, and wherein generated said per-value interpretation information is adapted to use said generated result as an input parameter for a database lookup operation to obtain interpretation information corresponding to said generated result.

13. A set of components according to claim 1, wherein the generated per-value interpretation information includes audio clips.

14. A method for providing to a user of a data processing system per-value interpretative information relating to data values of an application component, the method including the steps of:

in response to user selection of an operation and user selection of a set of an application component's data values, processing the selected set of data values to generate a result according to said selected operation;

generating per-value interpretation information corresponding to said generated result; and providing said per-value interpretation information to the application component for display to the user;

identifying user selection of a specific data value of said selected set in response to movement of the input device pointer into a display area associated with the identified specific data value, and displaying to the user the generated per-value interpretation information for the specific data value on a display device connected to the data processing system.

15. A method according to claim 14, wherein said processing of the selected set of data values comprises comparing each data value of a selected set with other values in the set or with a reference value and generating a result for each value indicative of the relationship between the respective value and said other values in the set or the reference value, respectively, and generating a result for each value indicative of the relationship between the respective value and said other values in the set or the reference value, respectively, and generating per-value interpretation information which is descriptive of said relationship.

16. A method according to claim 15, wherein the generation of per-value interpretation information comprises generation of an annotation string for each of said set of selected data values wherein the respective generated annotation strings represent the relationship between the respective data value and other data values of said set.

17. A computer program product comprising computer program code recorded on a computer readable storage medium, the computer program code including a set of components for providing per-value data interpretation information to a user of a data processing system having an input device pointer and a connected display device, the computer program product comprising:

an application program code component for displaying data values to the data processing system user;

a processing program code component for responding to user selection of an operation to be performed to user selection of a set of the application component's data values to (a) perform the selected processing operation on the selected set of data values to generate a result, (b) generate per-value interpretation information corresponding to said generated result, and (c) provide said per-value interpretation information to the application component for display to the user;

wherein the application program code component is responsive to positioning of said input device pointer, subsequent to said provision of generated interpretation information, to (d) identify a specific data value of said selected set in response to movement of the input device pointer into a display area associated with the identified specific data value, and (e) display to the user the generated per-value interpretation information for the identified specific data value on a display device connected to the data processing system.

18. A computer program product as in claim 17, wherein said processing program code component includes computer program code means for comparing each data value of a selected set with other values in the set or with a reference value and for generating a result for each value indicative of a relationship between the respective value and said other values in the set or the reference value, respectively, and wherein generated said per-value interpretation information is adapted to generate information descriptive of said relationship.

19. A computer program product as in claim 18, wherein said processing program code component includes computer program code means for comparing the identified specific data value with the other data values within a predefined partition of the selected set which partition includes the identified specific data value.

20. A computer program product as in claim 19, wherein the application program code component comprises computer program code means for displaying the generated per-value interpretation information as alphanumeric text within a status line message.

21. A computer program product as in claim 20, wherein said processing program code component is one of a plurality of processing program code components each comprising a processing object class instantiable to provide objects for generating the per-value interpretation information within an object oriented processing environment, said objects being adapted to interface with application program code components comprising additional objects adapted to interface with the processing objects such that data values can be provided from an application program code component to the processing object and interpretation information can be returned from the processing object to the respective application program code component.

22. A computer program product as in claim 21, including a connection class instantiable to provide a connection object for managing the flow of application data, processing results and interpretation information between application program code components and processing objects.

23. A computer program product as in claim 22, wherein each processing object comprises a controller object and an associated algorithm object, the controller object being adapted to make calls to the algorithm object to perform a calculation on selected data values to generate a result and the controller object being adapted to generate per-value interpretation information using said result.

24. A computer program product as in claim 23, wherein said generation of per-value interpretation information comprises initiating a database lookup operation using a selected data value as an input parameter for controlling said database lookup operation.

25. A computer program product as in claim 23, wherein generated said per-value interpretation information is further adapted to use said generated result as an input parameter for a database lookup operation to obtain interpretation information corresponding to said generated result.

* * * * *